Feb. 19, 1935.  W. H. LLOYD  1,991,933
LIFEGUARD OR CATCHER FOR VEHICLES
Filed July 10, 1933    2 Sheets—Sheet 1

INVENTOR
WILLIAM HENRY LLOYD.
BY
Percy Haddan
ATTORNEY

Feb. 19, 1935.  W. H. LLOYD  1,991,933
LIFEGUARD OR CATCHER FOR VEHICLES
Filed July 10, 1933  2 Sheets-Sheet 2

INVENTOR
WILLIAM HENRY LLOYD.
BY
*Percy Haddan*
ATTORNEY

Patented Feb. 19, 1935

1,991,933

UNITED STATES PATENT OFFICE 1,991,933

LIFEGUARD OR CATCHER FOR VEHICLES

William Henry Lloyd, London, England

Application July 10, 1933, Serial No. 679,788
In Great Britain May 19, 1933

1 Claim. (Cl. 293—37)

This invention relates to an improved lifeguard or catcher for vehicles and particularly for motor-cars, motor-buses, and other motor driven vehicles.

The object of my invention is to provide the front of the vehicle with a lifeguard operating as a catcher or scoop on which a pedestrian, dog, or the like, hit by the vehicle, will be caught up and so be prevented from being run over by, or thrown under the vehicle.

My improved lifeguard or catcher is arranged between the front wheels of the vehicle and is in the form of a platform, constructed for instance of transverse slats, and normally is maintained horizontal or approximately horizontal and clear of the road or ground along which the vehicle is travelling, but immediately on impact of a buffer bar or the like, comprised in the mechanism of my device, or of the front edge of the catcher proper or of an extension of same, with a foot passenger or a dog or the like, a front portion of the catcher will automatically be brought into contact with the road surface while at the same time the catcher as a whole is tilted in such a way that the foot passenger or the dog or the like will be caught up by the catcher and thereby prevented from passing under the motor vehicle.

This dropping movement of the catcher is effected entirely automatically.

The annexed drawings illustrate an example of construction of the invention.

Figure 1:
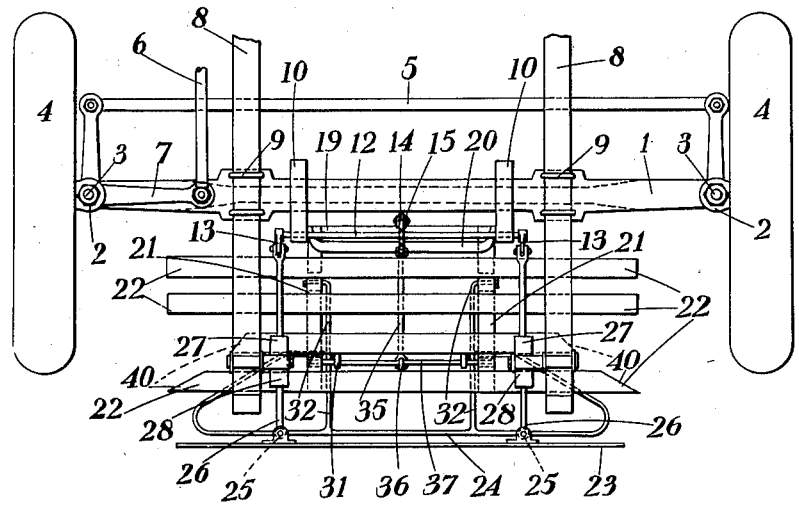
Fig. 1 is a plan view of the device attached to the front part of a motor car.
Figure 2:
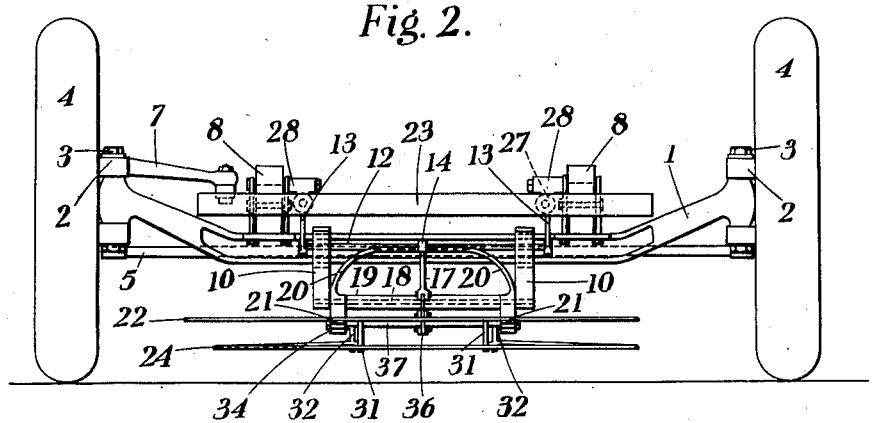
Fig. 2 is a front elevation of Fig. 1.
Figure 3:
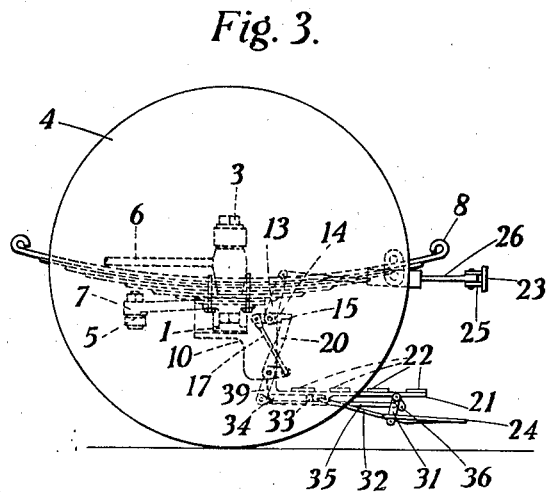
Fig. 3 is a side view of Fig. 2.

Referring to Figs. 1 to 3—

The front wheel axle is indicated by the reference character 1 and carries at each end the bearing 2 for the stud axles 3, round which the wheels 4 can be turned in the usual way for steering purposes. 5 indicates the tie rod and 6, 7 the steering rod and link all of the usual construction.

The springs are shown at 8 connected to the axle 1 by the shackles 9.

Attached to the front axle 1 by bolts or the like are two brackets 10 provided with bearings in which is mounted a cross-rod 12 capable of a movement of rotation and carrying at each end a crank 13 keyed thereto.

Fixed to the center of the cross-rod 12 is a short two armed lever 14 the front arm of which constitutes a hook 15 and the rear end is provided with a pivot 16 on which is pivoted the one end of a link rod 17.

The movement of rotation of the cross-rod 12 and a tilting movement of the two arm lever 14, with consequent lifting of the hook 15, can be effected either by a movement of the crank 13 or of the link rod 17 as will be fully explained hereinafter.

Figure 4:
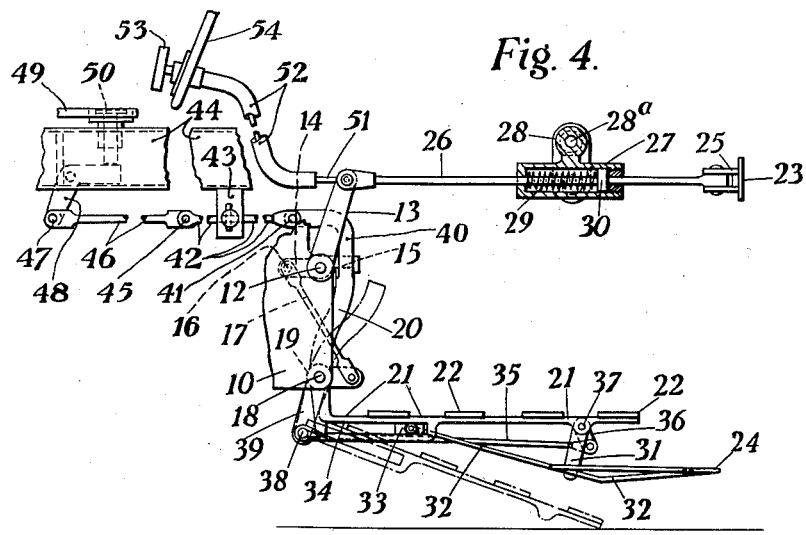
Fig. 4 is a side view drawn to an enlarged scale, with parts in section illustrating the construction and action of the release mechanism of the guard.

Extending between the brackets 10 is a fixed shaft 18 and pivotally mounted on this shaft is a frame 20 by means of collars 19 integral with the ends of the frame 20 which is normally maintained in the vertical position by the hook 15 of the two arm lever 14 as clearly shown in Fig. 4.

The frame 20 is integral with the main part of the catcher or life-guard which is constituted of two identical side arms 21 welded to the collars 19 of the frame 20, these side arms 21 carrying thin metal or other cross slats 22. The frame 20 and the catcher formed by the said arms and slats constitutes a whole so that the catcher is normally supported in the horizontal position as shown in Fig. 4 as long as the hook 15 of the two armed lever 14 engages the frame 20.

As previously mentioned the hook 15 will release the frame 20 either by a movement of the cranks 13 or the link rod 17 and the necessary movement of these is automatically effected by mechanism set in action by the impact with a pedestrian, dog or the like of a buffer bar 23 mounted on the car so as to extend in front of the wheels 4 or of a forward extension 24 of the catcher.

The buffer bar 23 formed for instance of a strip of resilient steel is provided at its rear face with two lugs 25 to which two parallel rods 26 are connected, the rear ends of these rods being connected each to a crank 13 of which there are two as previously described respectively keyed to the ends of the shaft 12.

These rods 26 are supported in bearing cylinders 27 which may be carried by sockets 28 integral with said cylinders and pivotally mounted on bolts 28ª mounted on the vehicle springs 8 as shown in Fig. 1.

In certain cases the cylinders 27 instead of being mounted on the springs 8, may be mounted on the chassis of the car.

Within the cylinders 27 are coil springs 29 which abut against the ends of the cylinders at one end and against collars 30 fixed on the rods 26 within the cylinders as shown in Fig. 4.

These springs therefore tend to maintain the buffer bar 23 in the most forward position and also the hook 15 engaged on the frame 20 as can be easily understood.

The extension 24 of the catcher in the form of a frame as shown in Fig. 1 is movably connected by links 31 to the side member 21 of the catcher proper as shown in Fig. 4. This extension frame also comprises two parallel bars 32 pivotally connected at their free ends to blocks 33 slidable in guide apertures 34 of the side members 21.

The rod 35 is at its front end pivoted to a link 36 centrally mounted on a cross shaft 37 which also carries the links 31 connected at their other ends to the bars 32 of the extension 24 of the catcher. The other end of the rod 35 is pivoted as at 38 to one arm of a bell-crank lever 39 pivoted on the cross shaft 18 the other arm of the bell crank lever 39 being pivoted to the lower end of the link rod 17.

The working is as follows:

Assuming that a person is struck by the buffer 23 during travel of the car owing to the driver not being able to stop the car in time, the impact will cause the rods 26 to move inwards against the action of the springs 29 which will have the effect of giving a slight movement of rotation to the cross-rod 12 thereby turning the two armed lever 14 so that the hook 15 rises and releases the frame 20 whereupon the catcher drops to the position shown in dotted lines in Fig. 4 with its front part substantially flat on the ground.

This dropping of the catcher is practically instantaneously effected after the person has been struck by the buffer so that as he falls he will be immediately caught up on the catcher and so prevented from being run over by the car.

Similarly the catcher will automatically drop to the position shown in dotted lines, if the front part 24 of the catcher itself strikes an object for instance a person fallen to the ground or a dog which would not be tall enough to be struck by the buffer 23.

If the part 24 meets such an obstacle the rods 32 will move backwards while the blocks 33 slide in the guides 34 of the side-members 21 this movement causing through the links 31, 36, a rearward movement of the rod 35 which by tilting the bell-crank lever 39 will cause a pull on the link rod 17 which will cause the lever 14 to tilt so that its hook releases the frame 20 and the front part of the catcher falls to the ground as previously described.

In order to allow free and full directional movement of the wheels 4 for steering purposes certain of the slats may be shorter and shaped at their ends as shown at 40 or in any other convenient way.

For additional safety precautions the catcher herein described may be advantageously used in combination with the life-guards for the front wheels of motor cars described in my prior application, Serial No. 679,430, filed July 7, 1933, although it can be applied to a car by itself and will operate in the manner described.

Further I provide means, an example of construction of which is shown in Fig. 4, operable by the driver of the vehicle whereby he can either lower the catcher in case of need or raise the same to the normal position clear of the road in the case of accidental dropping thereof due to impact with a minor object such as a large stone or a paving curb since the catcher will immediately and automatically drop on contact with such object.

The operation of raising or lowering the catcher can be immediately effected by the driver without his having to leave his seat and while the vehicle is running. Thus any accidental dropping of the catcher would not cause a delay in the traffic in the case of this happening in a crowded thoroughfare.

I attain this object by providing, for raising the catcher, suitable lever mechanism connected to the catcher and operated by a pedal or the like from the driver's seat and for lowering the catcher I provide a suitable traction cable or the like.

For instance, for raising the catcher, to the vertical frame 20 I attach a short vertical forked lever 40 in the fork of which is pivotally connected at 41 the one end of a horizontal rod 42 mounted at an intermediate point of its length on a bearing 43 attached to the chassis 44 allowing horizontal movement and also tilting movement of this rod.

The other end of this rod is pivoted at 45 to a second rod 46 in extension thereof and the end of this second rod is pivoted at 47 to one end of a bell-crank lever 48, pivotally carried by the chassis the other end of said lever being pivoted to an arm extending through a slot in the floor 49 of the driver's seat and having a pedal 50 at its upper end.

This mechanism is so arranged that as long as the catcher is in the normal position this pedal remains flush with the floor of the driver's seat as shown in Fig. 4 and cannot in this position be depressed, that is to say, be operated, but immediately the catcher drops the pedal rises and provided there is no undue weight on the catcher the latter can immediately be brought back to the normal raised position by depressing the pedal which, as the frame 20 will be then caught and locked by the hook 15, will then resume its normal, that is to say inoperative position.

To allow the catcher to be lowered by the driver without leaving his seat I attach the one end of a cable 51 working in a sheath 52 to the lever 13, the other end of this cable being attached to a draw-knob 53 or the like on the dash-board 54 of the car. By pulling on the knob 53 the said lever 13 is drawn backwards and the catcher released from its retaining hook so that it immediately drops.

Further in order to prevent a person hit by the car from being hurt by falling against the car radiator, I provide a spring-buffer shield for the radiator this shield being connected by springs to a metal bridge surrounding the radiator frame and bolted to the chassis and carrying a guard rail or rails extending forwardly of the radiator.

The shield and the guard rails may be padded and mounted in any other resilient manner than that described.

The construction and arrangement of the parts herein described allows of fitting the device to existing cars.

What I claim as my invention and desire to secure by Letters Patent of the United States is:—

In a lifeguard for motor vehicles, a slatted frame constituting a catching structure, means normally holding said slatted frame in the horizontal position and clear of the ground along which the motor vehicle is travelling, a forward extension of said slatted frame, means pivotally linking said extension to said slatted frame, parallel rods of said extension, side members of said slatted frame having guide slots, blocks on free ends of said parallel rods slidable in said guide slots, and lever and link mechanism connecting said slatted frame to the means holding it in the horizontal position whereby if said forward extension meets an obstacle said blocks will slide in said slots and said lever and link mechanism will release the holding means of the slatted frame allowing it to drop while the said forward extension will come to lie flat on the road along which the vehicle is travelling.

WILLIAM HENRY LLOYD.